(12) United States Patent
Lanfant et al.

(10) Patent No.: US 12,502,852 B2
(45) Date of Patent: Dec. 23, 2025

(54) METHOD FOR PRODUCING A VANE COMPRISING A REINFORCED CAVITY

(71) Applicant: SAFRAN, Paris (FR)

(72) Inventors: Nicolas Pierre Lanfant, Moissy-Cramayel (FR); Bastien Tranquart, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/702,645

(22) PCT Filed: Oct. 14, 2022

(86) PCT No.: PCT/FR2022/051942
§ 371 (c)(1),
(2) Date: Apr. 18, 2024

(87) PCT Pub. No.: WO2023/067269
PCT Pub. Date: Apr. 27, 2023

(65) Prior Publication Data
US 2024/0326359 A1    Oct. 3, 2024

(30) Foreign Application Priority Data

Oct. 20, 2021    (FR) ........................................ 2111143

(51) Int. Cl.
*B29C 70/68*     (2006.01)
*B29C 70/48*     (2006.01)
(Continued)

(52) U.S. Cl.
CPC ............ *B29C 70/682* (2013.01); *B29C 70/48* (2013.01); *B29C 70/688* (2013.01); *B29C 70/865* (2013.01); *B29L 2031/08* (2013.01)

(58) Field of Classification Search
CPC ..... B29C 70/682; B29C 70/48; B29C 70/688; B29C 70/865
See application file for complete search history.

(56) References Cited

U.S. PATENT DOCUMENTS

2002/0038923 A1*  4/2002  Lenherr ................. B29C 70/48
                                                               425/86
2010/0054930 A1    3/2010  Morrison
(Continued)

FOREIGN PATENT DOCUMENTS

CN      102271888 A     12/2011
CN      103492724 A     1/2014
(Continued)

OTHER PUBLICATIONS

Messler, Jr., R.W. S. Genc, Integral Micro-Mechanical Interlock (IMMI) Joints for Polymer-Matrix Composite Structures, Journal of Thermoplastic Materials, vol. 11, No. 3 (May 1998). (Year: 1998).*
(Continued)

*Primary Examiner* — Matthew J Daniels
(74) *Attorney, Agent, or Firm* — Pillsbury Winthrop Shaw Pittman LLP (57) ABSTRACT

A method for manufacturing a composite material vane with a cavity, includes making a core with the shape of the cavity of the vane to be manufactured, the core including a reinforcing structure occupying only part of the volume of the core, the remaining volume of the core being occupied by a material of a fleeting nature, forming a composite material skin around the core, and eliminating the fleeting material to obtain a composite material vane with a cavity reinforced by the reinforcing structure.

7 Claims, 6 Drawing Sheets

(51) Int. Cl.
*B29C 70/86* (2006.01)
*B29L 31/08* (2006.01)

(56) References Cited

U.S. PATENT DOCUMENTS

| | | | |
|---|---|---|---|
| 2013/0017093 A1* | 1/2013 | Coupe | B29C 70/72 |
| | | | 416/230 |
| 2015/0040396 A1 | 2/2015 | Fremont et al. | |
| 2019/0077111 A1* | 3/2019 | Robrecht | B32B 7/12 |
| 2019/0195073 A1* | 6/2019 | Sakala | B29C 70/70 |

FOREIGN PATENT DOCUMENTS

| | | |
|---|---|---|
| CN | 103974819 A | 8/2014 |
| CN | 104420890 A | 3/2015 |
| DE | 10 2018 125243 A1 | 4/2020 |
| EP | 0 192 507 B1 | 7/1988 |
| FR | 2 559 422 A1 | 8/1985 |
| WO | WO 2015/017001 A1 | 2/2015 |
| WO | WO 2016/151495 A1 | 9/2016 |
| WO | WO 2021/186480 A1 | 9/2021 |

OTHER PUBLICATIONS

Written Opinion of the International Searching Authority as issued in International Patent Application No. PCT/FR2022/051942, dated Jan. 19, 2023.

International Search Report as issued in International Patent Application No. PCT/FR2022/051942, dated Jan. 19, 2023.

* cited by examiner

METHOD FOR PRODUCING A VANE COMPRISING A REINFORCED CAVITY

CROSS-REFERENCE TO RELATED APPLICATIONS

This application is the U.S. National Stage of PCT/FR2022/051942, filed Oct. 14, 2022, which in turn claims priority to French patent application number 2111143 filed Oct. 20, 2021. The content of these applications are incorporated herein by reference in their entireties.

TECHNICAL FIELD

The present invention relates to the general field of composite material vanes, propellers or vane assemblies with an inner cavity.

PRIOR ART

In the field of aeronautical engines, the turbomachine vanes can be made of composite material in order to acquire resistance equivalent to or greater than metal, but a lower overall mass. Indeed, improving the performance of the turbomachine, particularly in relation to consumption, requires mass reduction.

In the case of the composite material vanes obtained by three-dimensional weaving, the composite material located at the core of the vane has only a reduced influence on the mechanical performance of the part, although it accounts for a significant part of the mass of the vane. Thus, it is interesting to manufacture hollow vanes, comprising a composite material skin obtained by three-dimensional weaving. Such a manufacturing method is for example described in document US2015040396A1.

However, the presence of a cavity inside the vane can be detrimental, particularly in the case of a long vane and a large cavity. Indeed, in this case, the thin composite material skins of the vane present low natural modes of vibration which are close to the natural modes of the engine in operation. Thus, the thin composite material skins can begin to vibrate, or enter in resonance.

Furthermore, the presence of a large cavity inside the vane reduces the resistance to torsion and to aerodynamic forces.

DISCLOSURE OF THE INVENTION

The present invention aims to propose a solution for making composite material turbomachine vanes with a reinforced inner cavity, by overcoming the aforementioned drawbacks.

To this end, the invention proposes a method for manufacturing a turbomachine vane made of composite material and having a cavity, comprising at least:
  making a core with the shape of the cavity of the vane to be manufactured, said core comprising a reinforcing structure occupying only part of the volume of the core, the remaining volume of the core being occupied by a material of fleeting nature,
  forming a composite material skin around the core, and
  eliminating the fleeting material to obtain a composite material vane with a cavity reinforced by the reinforcing structure.

Thus, the cavity of the vane obtained is reinforced by a reinforcing structure, giving the vane better mechanical resistance and reducing the risk of skin vibration. By occupying a limited volume of the vane cavity, the reinforcing structure does not add too much mass to the vane.

By "material of fleeting nature", it is meant here a material that can be mechanically, chemically or thermally eliminated.

According to one particular characteristic of the invention, the reinforcing structure has at least partly lattice architecture.

According to another particular characteristic of the invention, the reinforcing structure comprises at least one support element joining two walls of the cavity facing each other.

This support element can for example take the form of a shell, a plate or a solid body. On the final vane, these support elements can simultaneously support the two skins forming the intrados and the extrados of the vane, so as to increase the mechanical resistance of the vane and limit the risk of vibration of the skins.

According to another particular characteristic of the invention, the support element is positioned on one or several antinodes of the natural modes of vibration of the walls of the cavity.

By placing one or several support elements on the antinodes of the natural modes of vibration, it is possible to effectively reinforce the cavity of the vane or of the vane assembly with reduced and light support elements.

According to another particular characteristic of the invention, the support element is a solid body matching the shape of a portion of the cavity.

According to another particular characteristic of the invention, the reinforcing structure comprises protrusions projecting towards the outside of the core.

These projecting protrusions ensure a better mechanical connection between the reinforcing structure and the composite material skin of the vane.

According to another particular characteristic of the invention, the composite material skin is made by injection of a matrix precursor resin into a fibrous preform covering the core, the method further comprising the treatment of said resin to obtain a skin comprising a fibrous reinforcement densified by said matrix.

According to another particular characteristic of the invention, the fibrous preform is made by insertion of the core into a non-interlinking of a fibrous blank made in one piece by three-dimensional weaving of yarns.

According to another particular characteristic of the invention, the fibrous preform is obtained by draping of fibrous strata around the core.

According to another particular characteristic of the invention, the composite material skin is made by draping of fibrous strata pre-impregnated with a matrix precursor resin around the core, the method further comprising the treatment of said resin to obtain a skin comprising a fibrous reinforcement densified by said matrix.

DESCRIPTION OF THE EMBODIMENTS

The invention generally applies to different types of composite materials parts comprising an inner cavity. The invention finds an advantageous application for the vane assemblies of turbomachines, and in particular for the vanes or stators for an aeronautical gas turbine engine of the outlet guide vane or OGV type.

A core, having the shape of the inner cavity of the composite material vane to be made and comprising a reinforcing structure, is made.

Figure 1:
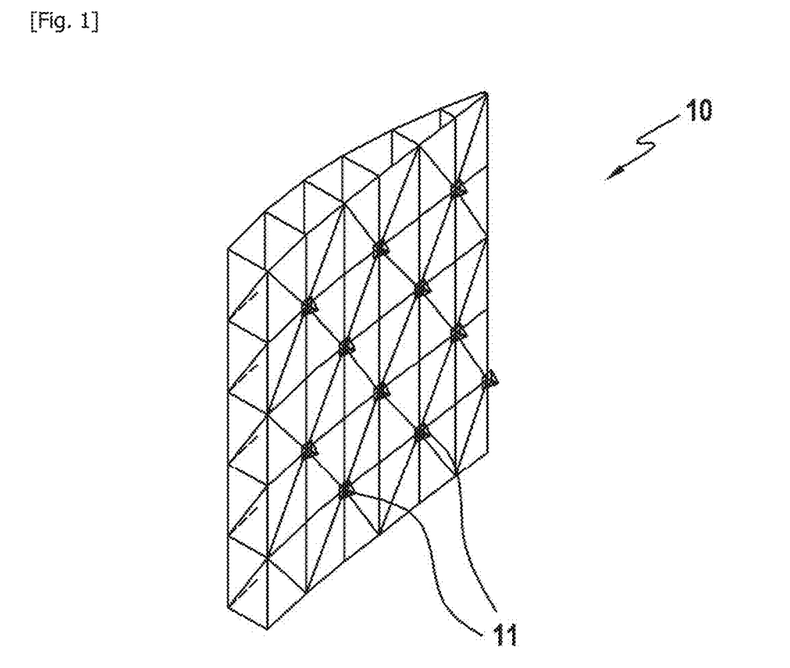
FIG. 1 is a schematic three-dimensional view of a lattice reinforcing structure in accordance with the invention.
Figure 2:
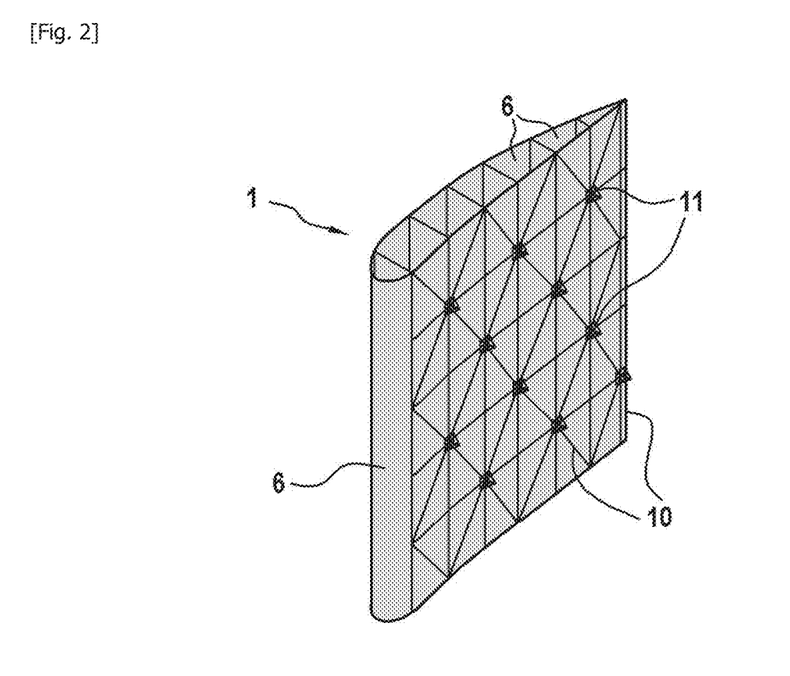
FIG. 2 is a schematic three-dimensional view of a core in accordance with the invention comprising the reinforcing structure of FIG. 1.

As illustrated in FIGS. 1 and 2, the reinforcing structure can take the form of a lattice and consist of a three-dimensional set of bars. FIGS. 1 and 2 respectively illustrate a reinforcing structure 10 and a core 1 comprising the reinforcing structure 10. The lattice 10 has the dimensions of the core to be made, so that the reinforcing structure is flush with the external surface of the core as illustrated in FIG. 2. In the example illustrated in FIGS. 1 and 2, the bars are straight and of constant section. The bars can be of non-constant section or curved.

Figure 3:
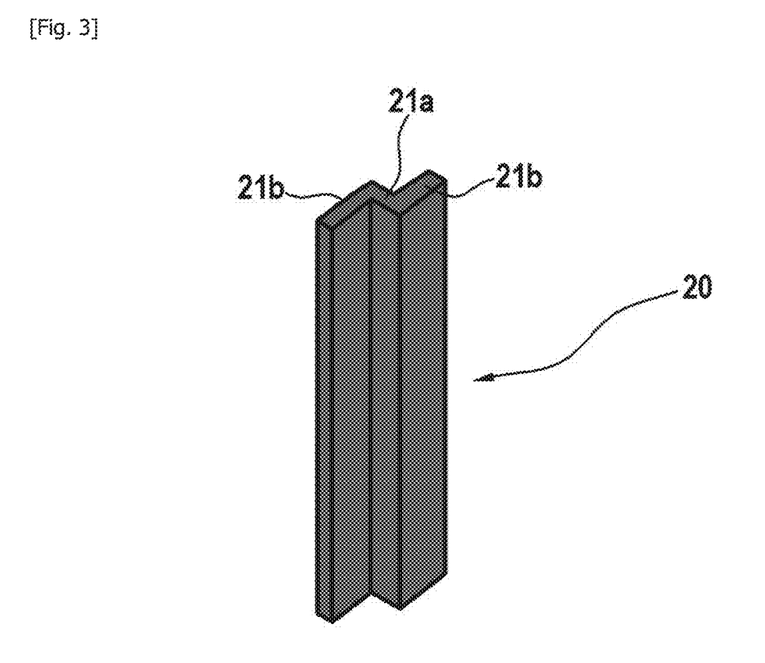
FIG. 3 is a schematic three-dimensional view of a reinforcing structure comprising a shell in accordance with the invention.
Figure 4:
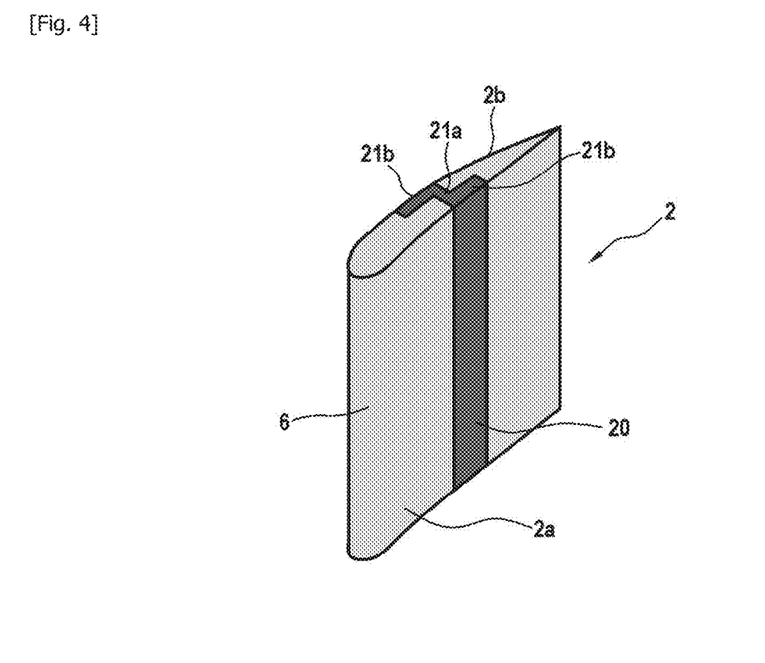
FIG. 4 is a schematic three-dimensional view of a core in accordance with the invention comprising the reinforcing structure of FIG. 3.

As illustrated in FIGS. 3 and 4, the reinforcing structure can include one or several shell-shaped portions 20. FIGS. 3 and 4 respectively illustrate a reinforcing structure 20 and a core 2 comprising the reinforcing structure 20. The reinforcing structure 20 is flush with the surface of the core.

The shell-shaped portions can be judiciously placed to support or reinforce particular areas of the vane. According to one particular embodiment of the invention, a preliminary study of the vibration modes of the vane skins can be conducted to determine the location of the antinodes of the vibration modes. Preferably, it will be sought to determine the flexural and simple torsional modes. Thus, the shell-shaped portions will be preferably placed orthogonally at the locations of the skins corresponding to antinodes.

In the example illustrated in FIGS. 3 and 4, the shell-shaped reinforcing structure 20 can comprise a central portion 21a and two support portions 21b positioned perpendicularly on either side of the central portion 21a. The central portion 21a is positioned perpendicularly to the two surfaces 2a and 2b of the core 2 intended to come into contact with the skins of the vane assembly, which will correspond to the intrados and extrados of the vane. Thus, the reinforcing structure will be able to support and reinforce the two skins of the vane assembly in order to limit their vibrations. The dimensions of the central portion 21a and two support portions 21b may differ from those represented in FIGS. 3 and 4. Preferably, thinner thicknesses for the central portion 21a and for the support portions 21b will even be chosen in order to reduce the mass.

The shell-shaped portions can also be positioned at the level of the areas of the vane assembly of greater thickness. Furthermore, the shell-shaped portions can also have an interesting geometry from an acoustic point of view, for example to reduce noise pollution.

Figure 5:
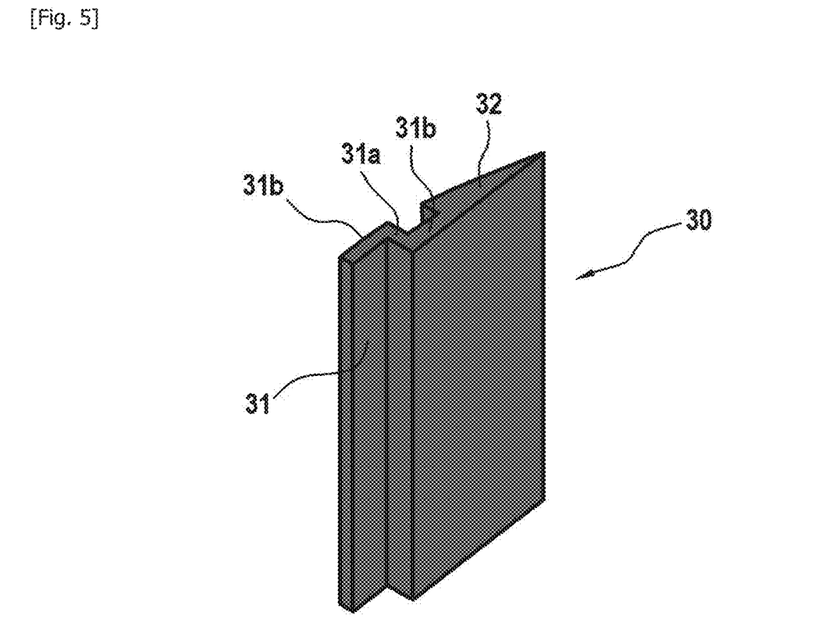
FIG. 5 is a schematic three-dimensional view of a reinforcing structure comprising a shell and a solid body in accordance with the invention.
Figure 6:
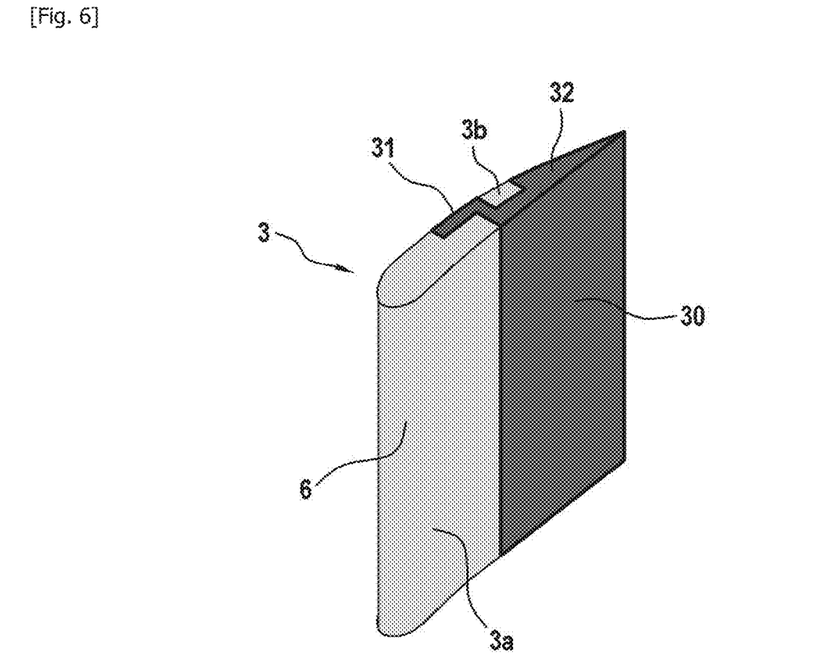
FIG. 6 is a schematic three-dimensional view of a core in accordance with the invention comprising the reinforcing structure of FIG. 5.

The reinforcing structure can also include solid bodies, which will match the shape of a portion of the vane cavity. FIGS. 5 and 6 respectively illustrate a reinforcing structure 30 and a core 3 comprising the reinforcing structure 20.

As illustrated in FIGS. 5 and 6, the reinforcing structure 30 includes a solid body 32 and a shell-shaped portion 31. Particularly, the shell-shaped portion 31 comprises a central portion 31a and two support portions 31b positioned perpendicularly on either side of the central portion 31a. The central portion 31a is positioned perpendicularly to the two surfaces 3a and 3b of the core 3 intended to come into contact with the skins of the vane assembly, which will correspond to the intrados and the extrados of the vane. The dimensions of the central portion 31a and two support portions 31b may differ from those represented in FIGS. 5 and 6. Preferably, thinner thicknesses for the central portion 31a and for the support portions 31b will even be chosen in order to reduce the mass.

The solid bodies of the reinforcing structure can be judiciously placed so as to support or reinforce particular areas of the vane. However, if the reinforcing structure is made of metal, it will be sought to limit the presence and size of solid bodies in the metal reinforcing structure in order to limit its mass.

Figure 7:
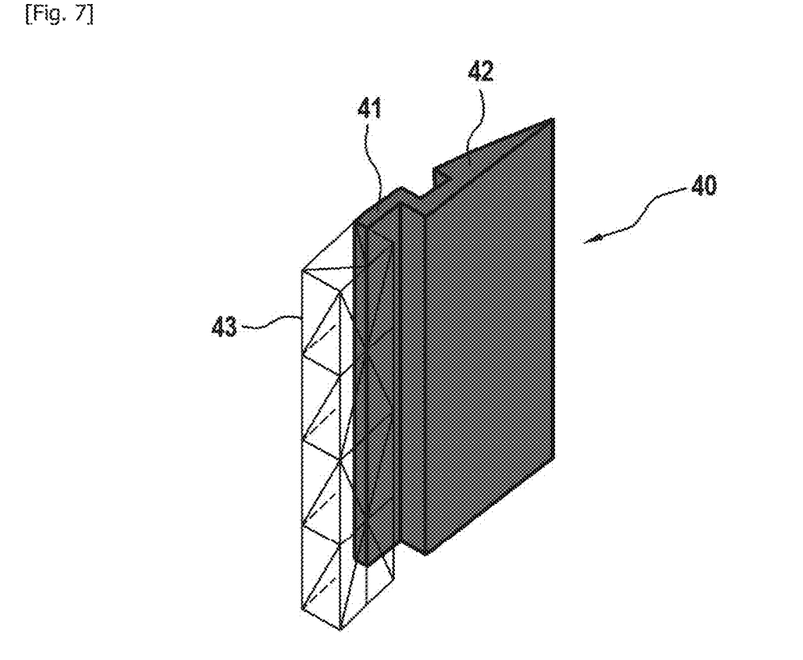
FIG. 7 is a schematic three-dimensional view of a reinforcing structure including a lattice, a shell and a solid body in accordance with the invention.
Figure 8:
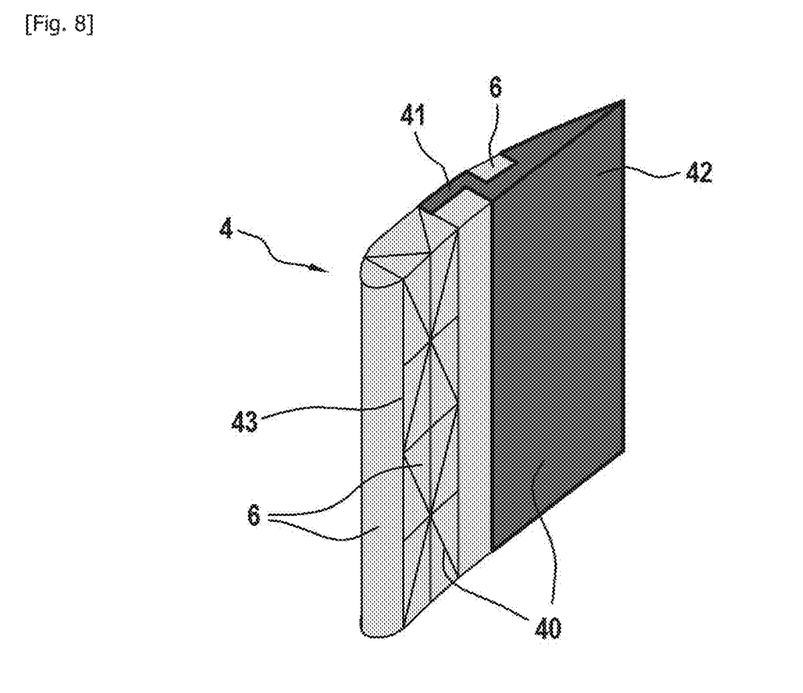
FIG. 8 is a schematic three-dimensional view of a core in accordance with the invention comprising the reinforcing structure of FIG. 7.

The reinforcing structure can comprise and combine different types of reinforcement. Thus, as illustrated in FIGS. 7 and 8, the reinforcing structure can include lattice portions 43, shell-shaped portions 41 and solid bodies 42. FIGS. 7 and 8 respectively illustrate a reinforcing structure 40 and a core 4 comprising the reinforcing structure 40. The lattice portions can be used in a preferred manner for the portions of the core with large volumes. The solid bodies can be used in a preferred manner in portions of the core with restricted volumes.

As illustrated in FIGS. 1 and 2, the reinforcing structure can comprise protrusions 11 projecting from the outer surface of the core and directed outwards. These projecting protrusions 11 are intended to ensure a mechanical grip between the reinforcing structure and the composite material skins of the vane. These projecting protrusions 11 can be disposed in a particularly interesting manner so as to ensure mechanical grip at the level of the skins of the composite material vane with a cavity. For example, in the case of a vane assembly, the projecting protrusions 11 will be mainly located so as to ensure a mechanical connection between the reinforcing structure and the intrados and the extrados of the vane assembly.

In the example shown in FIGS. 1 and 2, the projecting protrusions are oriented perpendicularly to the surface of the core. If the core is intended to be inserted into a fibrous preform, by non-interlinking for example, of such projecting protrusions can hinder the insertion of the core by gripping into the fibers of the preform before the final placement of the core. Thus, according to one particular embodiment of the invention, if the core is first inserted through a first surface, the projecting protrusions will be directed oppositely to said surface. Consequently, the core can be inserted through said surface without the protrusions "grabbing" to the fibers. When the core is correctly positioned in the fibrous preform, the projecting protrusions allow mechanical grip, particularly in the direction opposite to the direction of insertion of the core.

The lattice structures easily allow the passage of functional elements such as tows, pipes, conduits or yarns, inside and through the inner reinforcing structure of the vane. On the other hand, it may be necessary to make bores inside the shell-shaped structures or the solid bodies to allow the passage of these functional elements of the vane.

According to a first embodiment of the core of the invention, the reinforcing structure is made of metal.

A metal with a low coefficient of thermal expansion will be favored for the manufacture of the reinforcing structure in order to limit the stresses inside the composite material vane. The metal of the reinforcing structure can for example be titanium, inconel or stainless steel.

The metal reinforcing structure can be made by metal additive manufacturing. The metal reinforcing structure can also be manufactured by assembling several metal portions according to the conventional means. The assembly of the different portions can for example be made by welding or bonding.

The metal reinforcing structure thus made is then introduced into a tooling with the shape of the inner cavity of the vane to be made. A fleeting material 6 is injected or cast into the tooling, in order to form a core with the shape of the cavity of the vane to be made and comprising the metal reinforcing structure. The fleeting material can be cast or injected at high temperature, for example at a temperature above 400° C. Indeed, as the reinforcing structure is metallic, the fleeting material can be handled at relatively high temperatures without damaging the reinforcing structure. If the metal reinforcing structure has projecting protrusions, the casting or injection tooling allows the accommodation of these projecting protrusions.

The fleeting material may be a salt or a mixture of salts, for example a mixture of potassium chloride and potassium carbonate. The fleeting material may be sand or a mixture of sand. The use of such a fleeting material for the creation of a core is for example described in document EP0192507B1.

According to one variant, the complete core can be made in a single step, that is to say the metal reinforcing structure is made simultaneously with the rest of the core. The core is made by additive manufacturing of at least two materials, the first material being a metal intended to make the reinforcing structure and the second material being intended to make the fleeting portion 6 of the core. The second material can be for example a material of the ST-130™ FDM type marketed by the company Stratasys, which dissolves in a basic solution without damaging the composite material of the vane to be manufactured. In this variant, the second material intended to make the fleeting portion 6 of the core can be disposed only on the surface of the cavity, around the metal reinforcing structure. Thus, the core is not necessarily a solid core. The use of a partially empty core makes it possible to remove the fleeting portion 6 more quickly during its removal stage, which will be described later in the description.

According to a second embodiment of the core of the invention, the reinforcing structure is made of polymer or composite. The polymer for manufacturing the structure may contain discontinuous or continuous fibers. The fibers can be made of glass, carbon or aramid. The resin may be thermosetting or thermoplastic. Preferably, the polymer or composite reinforcing structure must be able to withstand the treatment temperatures of the composite material skins without being altered.

Thus, the reinforcing structure can preferably withstand temperatures of up to 180° C. without being altered.

The composite reinforcing structure can be made by composite additive manufacturing. The composite material reinforcing structure can also be manufactured by assembling several composite material portions, for example by bonding.

The composite reinforcing structure thus made is then introduced into a tooling with the shape of the inner cavity of the vane to be made. A fleeting material 6 is injected, cast or compressed into the tooling, in order to form a core having the shape of the cavity of the vane to be made and comprising the composite reinforcing structure. Preferably, the fleeting material must be cast, injected or compressed at a temperature that does not damage the composite material reinforcing structure. For example, the material Aquacore® is a ceramic material that can be used as a fleeting material to form the core, as it agglomerates at high pressure and only requires post-curing at a temperature below 100° C. The fleeting material may be a salt or sand based material, or a mixture. If the composite reinforcing structure has projecting protrusions, the casting or injection tooling allows the accommodation of these projecting protrusions.

According to one variant, the complete core can be made in a single step that is to say the composite reinforcing structure is made simultaneously with making the rest of the core.

According to a first example of this variant, the core is made by additive manufacturing of at least two materials, the first material being a composite intended to make the reinforcing structure and the second material being intended to make the fleeting portion 6 of the core. The second material can be for example a material of the ST-130™ FDM type marketed by the company Stratasys, which dissolves in a basic solution without damaging the composite material of the vane to be manufactured. In this variant, the second material intended to make the fleeting portion 6 of the core can be disposed only on the surface of the cavity, around the composite reinforcing structure. Thus, the core is not necessarily a solid core. The use of a partially empty core makes it possible to remove the fleeting portion 6 more quickly during its removal step, which will be described later in the description.

According to a second example of this variant, the core can be manufactured by sintering at least two powders, the first powder being intended to form the composite of the reinforcing structure, and the second powder being intended to form the fleeting portion 6 of the core.

When the core with the shape of the inner cavity of the composite material vane has been made, it is used to manufacture said composite material vane.

In the embodiments of the core of the invention presented above, it is important that the surface of the core is sealed. Indeed, during the method for manufacturing the composite material vane with an inner cavity, a creeping of the resin towards the inside of the core would increase the mass of the vane by filling the inner cavity with an unwanted material. Additionally, the creeping of the resin toward the inside of the core could result in the formation of porosities or dry areas in the external composite material.

A finishing operation can be performed on the core manufactured as described previously, to improve the surface condition or the sealing of the core. This finishing operation is particularly interesting for the cores made by 3D printing.

Different embodiments of a vane comprising a reinforced cavity according to the method of the invention will now be described.

According to a first embodiment of the method of the invention presented in FIGS. 9 to 12, a fibrous blank 100 intended to wrap the core is made.

Figure 9:
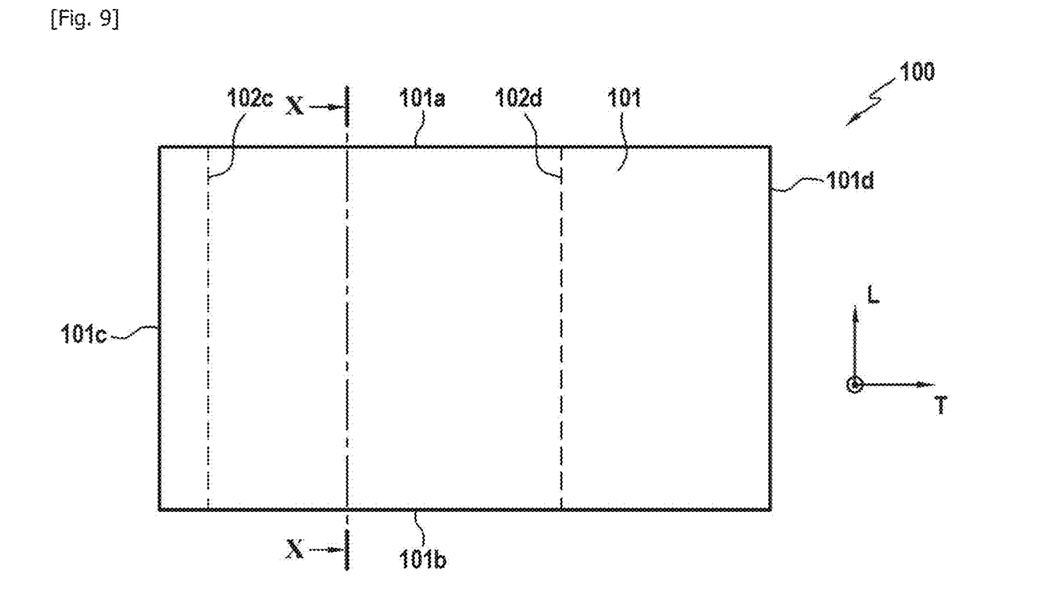
FIG. 9 is a schematic plan view of a woven fibrous blank intended for making a vane by RTM injection in accordance with one embodiment of the invention.

The blank 100 is obtained from a strip 101 woven by three-dimensional (3D) or multilayer weaving, the strip 101 generally extending in a direction L corresponding to the longitudinal direction of the vane to be manufactured. The weaving is performed for example with warp yarns extending in the L direction.

A non-interlinking 102 is formed substantially in the middle of the strip 101, over at least part of the length of the fibrous blank 100 between the longitudinal edges 101c and 101d, between limits 102c and 102d. Preferably, the non-interlinking 102 must extend at least as far as one of the transverse edges 101a and 101b. In the example illustrated in FIGS. 9 and 10, the non-interlinking extends over the entire length of the fibrous blank 100, between the transverse edges 101a and 101b. This non-interlinking 102 makes it possible to form an inner cavity in the fibrous blank 100, intended to allow the passage of the core previously made.

The fibrous blank can be made by 3D weaving using an interlock weave comprising the non-interlinking. By "interlock" weave, it is meant here a weave in which each layer of weft yarns interlinks a plurality of layers of warp yarns, with all of the yarns in the same weft column having the same movement in the weave plane. In a well-known manner, the non-interlinking is provided between two layers of warp yarns by omitting to pass a weft yarn through the non-interlinked area to interlink layers of warp yarns located on either side of the non-interlinking.

Figure 10:
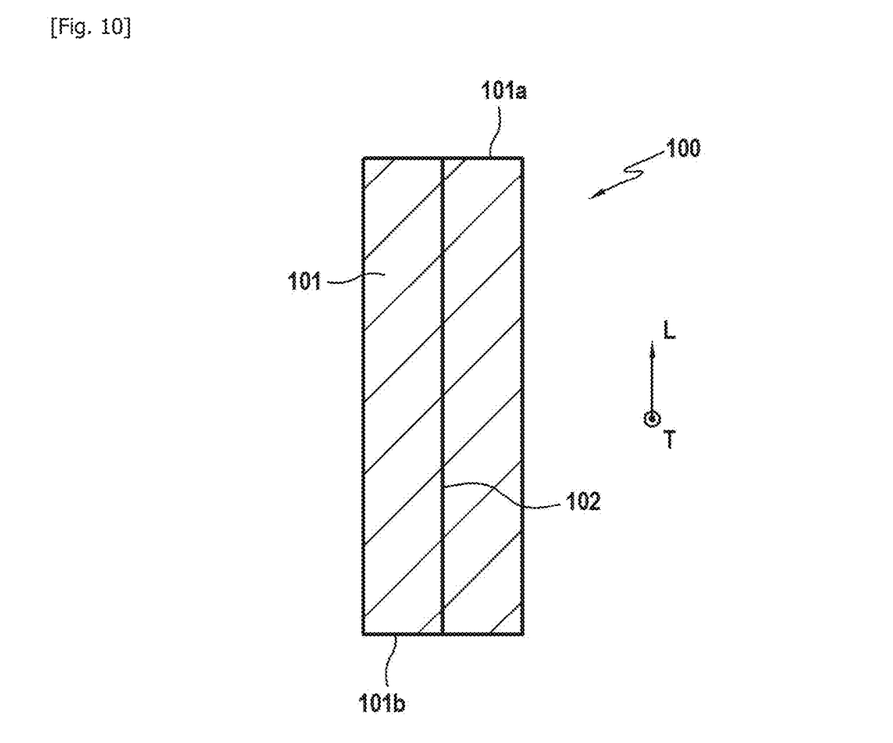
FIG. 10 is a sectional view of the fibrous blank of FIG. 9.

The fibrous blank 100 comprises a plurality of layers of warp yarns which are interlinked by 3D weaving except at the level of the non-interlinking 102. Excluding the non-interlinking 102, the layers of warp yarns of the blank 100 are all interlinked together.

Ceramic yarns can be used for the weaving, in particular yarns based on silicon carbide (SiC), for example those provided under the name "Nicalon" by the Japanese company Nippon Carbon. Other ceramic yarns can be used, in particular refractory oxide yarns, such as yarns based on alumina $Al_2O_3$, particularly for oxide/oxide type CMC materials (fiber of the fibrous reinforcement and refractory oxide matrix). Preferably, carbon yarns will be used for the weaving, for example for a CMC material with fibrous reinforcement made of carbon.

The fibrous strip can be treated to eliminate the sizing present on the fibers and the presence of oxide on the surface of the fibers as known per se.

Also known per se, a thin layer of embrittlement-release interphase coating can then be formed on the fibers of the fibrous strip by Chemical Vapor Infiltration or CVI. The interphase material is for example pyrolytic carbon PyC, boron nitride BN or boron-doped carbon BC. The thickness of the layer formed is for example comprised between 10 nanometers and 100 nanometers to maintain a capacity of deformation of the fibrous blanks.

The fibrous strip is then impregnated with a consolidation composition, typically a carbon precursor resin or a ceramic precursor resin optionally diluted in a solvent. The consolidation can be performed in an oven.

Figure 11:
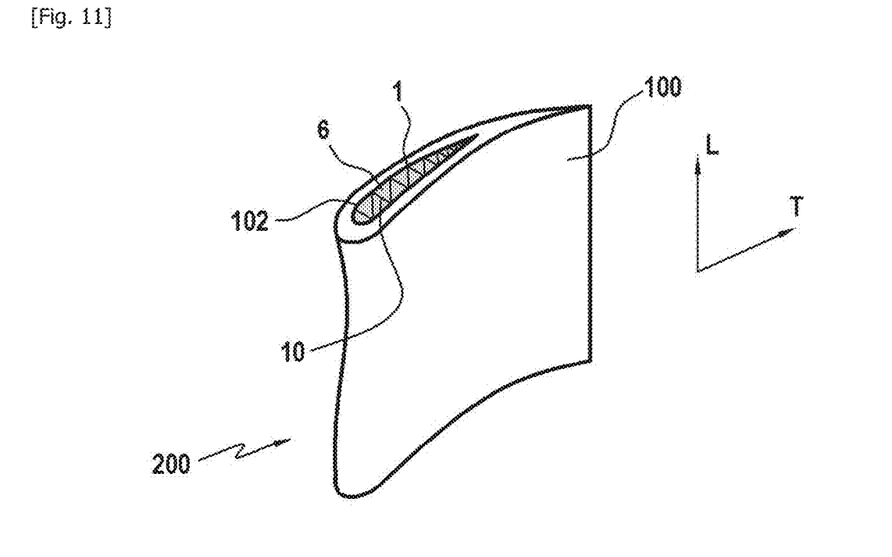
FIG. 11 is a schematic view of a fibrous preform made by insertion of a core according to the invention into the fibrous blank of FIGS. 9 and 10.

According to this first embodiment of the invention, the core is introduced into the fibrous blank 100 through the non-interlinking 102 so as to form a fibrous preform 200 as illustrated in FIG. 11. If the core has projecting protrusions on its outer surface, these are inserted between the yarns of the fibrous blank.

The fibrous preform 200 is then densified by filling the porosity of the preform, in all or part of its volume, with the material constituting the matrix. The composite material matrix of the part to be manufactured can be obtained in a manner known per se according to the liquid process.

A forming step can be preferably carried out after insertion of the core into the fibrous preform. This forming step makes it possible to reduce the expansion of the preform. This forming step is preferably carried out under heat, the fibrous preform being wet or dry.

The liquid process consists in impregnating the preform with a liquid composition containing an organic precursor of the matrix material. The organic precursor is usually in the form of a polymer, such as a resin, optionally diluted in a solvent. The preform disposed around the core is placed in a mold that can be closed in a sealed manner with a housing having the shape of the final molded part and which can in particular have a twisted shape corresponding to the final shape of the part to be manufactured. Then, the mold is closed and the liquid matrix precursor (for example a resin) is injected throughout the housing to impregnate the entire fibrous portion of the preform.

The transformation of the organic matrix precursor, namely its polymerization, is performed by heat treatment, generally by heating of the mold, after elimination of the possible solvent and crosslinking of the polymer, the preform always being maintained in the mold with a shape corresponding to that of the aerodynamic profile structure. The organic matrix can be in particular obtained from epoxy resins, such as the high-performance epoxy resin sold under the reference PR 520 by the company CYTEC, or from liquid precursors of carbon or ceramic matrices.

In the case of the formation of a carbon or ceramic matrix, the heat treatment consists in pyrolyzing the organic precursor to transform the organic matrix into a carbon or ceramic matrix depending on the precursor used and the pyrolysis conditions. For example, liquid carbon precursors can be resins with a relatively high coke rate, such as phenolic resins, while liquid ceramic precursors, in particular SiC, can be resins of the polycarbosilane (PCS) or polytitanocarbosilane (PTCS) or polysilazane (PSZ) type. Several consecutive cycles, from impregnation to heat treatment, can be carried out to achieve the desired degree of densification.

The densification of the fibrous preform is preferably performed by the well-known Resin Transfer Molding (RTM) process. In accordance with the RTM process, the fibrous preform disposed around the core is placed in a mold having the external shape of the desired part. The core can act as a counter-mold. A thermosetting resin is injected into the internal space delimited between the rigid material part and the mold and which comprises the fibrous preform. A pressure gradient is generally established in this internal space between the place where the resin is injected and the discharge orifices of the latter in order to monitor and optimize the impregnation of the preform by the resin.

The resin used can be for example an epoxy resin. The resins suitable for RTM processes are well known. They preferably have a low viscosity to facilitate their injection into the fibers. The choice of the temperature class and/or the chemical nature of the resin is determined according to the thermomechanical loads to which the vane is subjected. Once the resin has been injected throughout the reinforcement, it is polymerized by heat treatment in accordance with the RTM process.

The fleeting portion 6 of the core is then eliminated. If direct access to all fleeting portions of the core is not possible, bores can be made in the non-functional portions of the composite material vane. For example, in the case of a flow straightener, it will be chosen to make the bores in the platforms.

A suitable solution is put into contact with the fleeting portions 6 of the core so as to be able to eliminate them. For example, to eliminate the sand-based fleeting portions, the solution may contain at least one organic solvent such as dimethylformamide, piperidine, tetrahydrofuran or butanone. A basic solution can also be used, for example to eliminate the fleeting portions made of ST-130™ FDM type material marketed by the company Stratasys. In the case of water-soluble fleeting portions, the use of pressurized water is sufficient to eliminate the fleeting portions.

Figure 12:
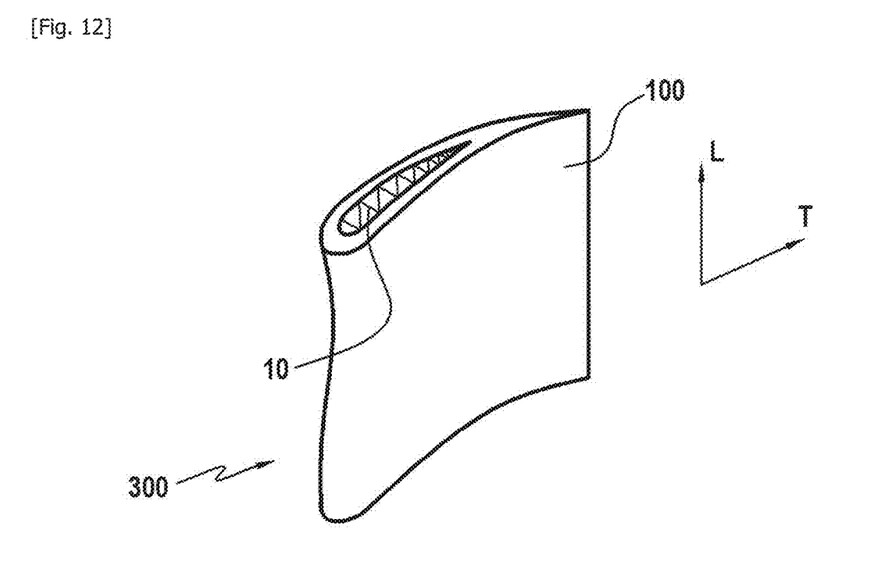
FIG. 12 is a schematic three-dimensional view of a vane made from the fibrous preform of FIG. 11.

A composite material vane 300 with an inner cavity reinforced by a reinforcing structure 10 as illustrated in FIG. 12 is thus obtained. If the reinforcing structure comprises projecting protrusions, these are inserted between the yarns of the composite material in order to create a mechanical grip between the reinforcing structure and the portion of the composite material vane manufactured by the RTM process.

According to a second embodiment of the method of the invention (variant not illustrated), the composite material vane with an inner cavity is made in a well-known manner by draping. Thus, fibrous layers are applied to the core previously made. The fibrous layers can be pre-impregnated with matrix precursor resin, or can be dry strata which will be densified by a resin after draping. The fibrous layers can be one-dimensional, two-dimensional or three-dimensional fabrics, provided they have a thickness allowing the draping. The fibrous layers can also have webs of discontinuous long fibers, with controlled or random distribution.

The resin(s) impregnating the layers are cross-linked by the same heat treatment performed on all of the fibrous layers. A composite material envelope around the core can thus be obtained.

The composite material vane can also be obtained in a well-known manner by ply lamination thermocompression.

The fleeting portion 6 of the core is then eliminated. If direct access to all fleeting portions of the core is not possible, bores can be made in the non-functional portions of the composite material vane. For example, in the case of a flow straightener, it will be chosen to make the bores in the platforms.

A suitable solution is put into contact with the fleeting portions of the core so that they can be eliminated. For example, to eliminate the sand-based fleeting portions, the solution may contain at least one organic solvent such as dimethylformamide, piperidine, tetrahydrofuran or butanone. A basic solution can also be used, for example to eliminate the fleeting portions made of ST-130™ FDM type material marketed by the company Stratasys. In the case of water-soluble fleeting portions, the use of water is sufficient to eliminate the fleeting portions.

A composite material vane with an inner cavity reinforced by a reinforcing structure is thus obtained. If the reinforcing structure comprises projecting protrusions, these are inserted between the yarns of the composite material in order to create a mechanical grip between the reinforcing structure and the composite material skins of the vane.

The invention claimed is:

1. A method for manufacturing a turbomachine vane made of composite material and having a cavity, comprising:
   making a core with a shape of the cavity of the vane to be manufactured, said core comprising a reinforcing structure occupying only part of the volume of the core, a remaining volume of the core being occupied by a material of a fleeting nature, the reinforcing structure having at least partly lattice architecture consisting of a three-dimensional set of bars,
   forming a composite material skin around the core, and
   eliminating the fleeting material to obtain a composite material vane with a cavity reinforced by the reinforcing structure,
   wherein at least one bar of the three-dimensional set of bars extends from an inner wall of the composite material skin to an opposite inner wall of the composite material skin,
   wherein the reinforcing structure comprises at least one support element joining two walls of the cavity facing each other, and
   wherein the method further comprises studying natural modes of vibration of the walls of the cavity in order to determine a location of anti-nodes of the natural modes of vibration, the support element being positioned on one or several of the antinodes of the natural modes of vibration of the walls of the cavity.

2. The manufacturing method according to claim 1, wherein the support element is a solid body matching the shape of a portion of the cavity.

3. The manufacturing method according to claim 1, wherein the reinforcing structure comprises protrusions projecting towards the outside of the core.

4. The manufacturing method according to claim 1, wherein the composite material skin is made by injection of a matrix precursor resin into a fibrous preform covering the core, the method further comprising treating said resin to obtain a skin comprising a fibrous reinforcement densified by said matrix.

5. The manufacturing method according to claim 4, wherein the fibrous preform is made by insertion of the core into a non-interlinking of a fibrous blank made in one piece by three-dimensional weaving of yarns.

6. The manufacturing method according to claim 4, wherein the fibrous preform is obtained by draping of fibrous layers around the core.

7. The manufacturing method according to claim 1, wherein the composite material skin is made by draping of fibrous strata pre-impregnated with a matrix precursor resin around the core, the method further comprising treating said resin to obtain a skin comprising a fibrous reinforcement densified by said matrix.

* * * * *